DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JULY 6, 1976

948 O.G. 8

T948,013

RADIAL CARCASS PLIES CONTAINING LOOSELY TWISTED NYLON OR POLYESTER STRANDS

John L. Brownlee, Decatur, Ala., assignor to Monsanto Company, St. Louis, Mo.

Filed Sept. 15, 1975, Ser. No. 613,684
Int. Cl. B60c *9/04*
U.S. Cl. 152—356
No Drawing. 13 Pages Specification

Carcass plies composed of loosely twisted nylon 66 or polyester strands embedded in rubber are used instead of conventional plies in radial tires. Use of the plies of the invention provides radial tires at reduced manufacturing costs without sacrificing durability, performance or riding comfort.